United States Patent [19]
Kim

[11] Patent Number: 5,627,437
[45] Date of Patent: May 6, 1997

[54] HORIZONTAL RASTER SIZE CONTROLLER FOR A MONITOR

[75] Inventor: Seog-gi Kim, Suwon, Rep. of Korea

[73] Assignee: SamSung Electronics Co., Suwon, Rep. of Korea

[21] Appl. No.: 521,539

[22] Filed: Aug. 30, 1995

[30] Foreign Application Priority Data

Aug. 30, 1994 [KR] Rep. of Korea ............ 21468/1994

[51] Int. Cl.$^6$ .................................................. H01J 29/70
[52] U.S. Cl. .............................. 315/399; 315/408; 315/411
[58] Field of Search ........................ 315/7, 399, 408, 315/411

[56] References Cited

U.S. PATENT DOCUMENTS

| | | | |
|---|---|---|---|
| 4,584,503 | 4/1986 | Pan | 315/399 X |
| 5,016,156 | 5/1991 | Ogawa | 315/408 X |
| 5,029,269 | 7/1991 | Elliott et al. | 363/21 |
| 5,034,667 | 7/1991 | Lendaro | 315/411 |
| 5,278,746 | 1/1994 | Matsumoto | 363/21 |
| 5,317,495 | 5/1994 | Furukawa | 363/21 |
| 5,357,175 | 10/1994 | Kameda et al. | 315/408 X |
| 5,466,993 | 11/1995 | Leaver | 315/411 |

Primary Examiner—Benny Lee
Assistant Examiner—Justin P. Bettendorf
Attorney, Agent, or Firm—Robert E. Bushnell, Esq.

[57] ABSTRACT

A device for adjusting a horizontal raster size in a monitor is disclosed, wherein, by detection of beam current applied to a cathode ray tube of induced voltage across a flyback transformer. An error detector detects overvoltage or overcurrent and generates a pulse to a frame compensator. A variation in size of horizontal raster is regulated by controlling output signal of a horizontal output and deflection circuit, whereby a stabilized video frame in horizontal size is obtained.

6 Claims, 3 Drawing Sheets

HORIZONTAL RASTER SIZE CONTROLLER FOR A MONITOR

CROSS-REFERENCE TO RELATED APPLICATIONS

This application makes reference to, incorporates the same herein, and claims all benefits accruing under 35 U.S.C.§119 from an application entitled *Horizontal Raster Size Control Device For Monitor* earlier filed in the Korean Industrial Property Office on 30 August 1994, which was duly assigned Ser. No. 94-21468 by that Office.

BACKGROUND OF THE INVENTION

The present invention relates to a horizontal raster size controller for a monitor, and more particularly, to a horizontal raster size controller in a monitor.

Conventionally, monitors are generally well known in the an to require incrementation of the amplitude of a beam current being applied to a cathode ray tube (CRT) therein in order to brighten screen, resulting in variations in both deflection current and high voltage applied to the cathode ray tube by the regulation characteristics of the flyback transformer. The size of a frame being displayed on a monitor eventually varies owing to the above mentioned variations.

A technique has been developed in which variations of voltage across a primary winding of flyback transformer (FBT) are controllable by a flyback transformer controller which receives a pulse signal having a duty cycle representing a detected variation in the amplitude of a high voltage across a secondary or third winding of the flyback transformer and generated by a high voltage sensor. Namely, when beam current flow applied to an anode of a cathode ray tube increases in amplitude, the size of a frame on the screen of a monitor is expanded, and while the voltage supply across the primary winding of the flyback transformer drops the horizontal size of the frame becomes constant or fixed in size owing to an attenuation of the horizontal beam current.

Such a technique for varying a voltage applied to a flyback transformer as described above causes the characteristics of flyback transformer to substantially change at its high voltage regulation and also to simultaneously vary the voltage level induced at respective terminals of windings on the secondary side of the flyback transformer.

If a voltage applied to one end of a screen resistor and induced across the secondary side of the flyback transformer drops, the brightness of a screen then becomes dimmer. In particular, when voltage applied to a resistor used for contrast control varies, then changes in back raster brightness are visually perceivable. In other words, a frame quality deterioration occurs owing to a significant variation of luminance of a frame having a video signal at a low voltage level.

A high voltage generator including switching transformer for controlling a flyback transformer which outputs a high voltage to an anode of a cathode ray tube is discussed in U.S. Pat. No. 5,278,746 to Tadahiko Matsumoto and entitled *High Voltage Generator*. The high output voltage is provided to an error amplifier by way of a bleeder resistor and a burlier amplifier. The error amplifier compares the detected high output voltage with a reference voltage such that as the high output voltage drops an error amplifier signal generated by the error amplifier becomes large. The error amplifier signal is input to a comparator for comparison to an integrated inverted horizontal drive signal waveform. The comparator outputs a pulse drive signal whose level rises with the rise of the integrated waveform and falls at a position where the integrated waveform and the error amplifier signal intersect. The pulse drive signal has its width narrowed with the increase in the high output voltage, but has its width widened with the decrease in voltage drop. Accordingly, the duty cycle of the pulse drive signal applied to the switching transformer is varied in response to variations in the detected high output voltage.

An earlier design for a high voltage generator including a flyback transformer which provides a high voltage to an anode of a cathode ray tube is discussed in U.S. Pat. No. 5,317,495 to Toshihiko Furukawa and entitled *Stabilized High Voltage Power Supply Circuit*. An operational amplifier of a controlling circuit receives the high output voltage fed back through a bleeder resistor and compares the fed back high output voltage with a reference voltage. The controlling circuit includes a switching transistor having its ON/OFF operations controlled by the output of the operational amplifier. The primary coil current of a control tranformer is controlled in accordance with the ON/OFF operations of the switching transistor, which in turn, controls the peak value of the pulse generated at the secondary side of the control transformer for controlling the primary side of the flyback transformer. The high voltage induced by the secondary side of the flyback transformer is therefore controlled in accordance with a variation of the high Output voltage.

A switching mode power supply having overvoltage protection is discussed in U.S. Pat. No. 5,029,269 to Brent Elliott, et al. entitled *Delayed Power Supply Overvoltage Shutdown Apparatus*. This power supply uses a error detector connected to the secondary side of the power supply transformer for detecting changes in the output voltage applied to a load. The detected error controls the ON/OFF durations, i.e., duty cycle, of a switching transistor connected to the control terminal of the primary winding of the power supply transformer in order to maintain the output voltage at a fixed level.

SUMMARY OF THE INVENTION

Accordingly, it is an object of the present invention to provide an improved horizontal raster size controller for a monitor.

It is another object to provide a horizontal raster size controller for preventing horizontal raster size of a frame being displayed from varying owing to fluctuation of beam current applied to a cathode ray tube by compensating a detected amplitude of overcurrent.

It is another object of the present invention to provide a horizontal raster size controller for a monitor to suppress a high voltage regulation by a feedback of induced voltage across one of the turns of a winding on the secondary side of a flyback transformer so as to stabilize the brightness change of a back raster according to the change of contrast in a frame.

To achieve these and other objects, there is provided a horizontal raster size controller in a monitor constructed according to the principles of the present invention having a horizontal output and deflection portion whose output signal is induced for output at an anode of a cathode ray tube by the control of a flyback transformer (FBT) controller across both primary and secondary windings of the flyback transformer, an error detection portion for detecting changes, or errors, in an induced current provided to the anode of a cathode ray tube from an output terminal of a secondary winding of the flyback transformer, and a horizontal raster size compensation portion for performing horizontal raster size compensation for a displayed frame by comparing the output signal of the error detection portion to a preset reference voltage and outputting a compared signal corresponding to the magnitude of difference therebetween to the horizontal output and deflection portion.

The horizontal raster size compensation portion may further have a comparing portion for comparing the preset reference voltage with a smoothed output pulse signal generated from the error detection portion to generate an output voltage corresponding to the level of difference therebetween, a voltage-to-current conversion portion for converting the output voltage of the comparing portion to current, and a comparison and amplifying portion for comparing the output voltage of the voltage-to-current conversion portion to a preset horizontal raster size control voltage and amplifying a resulting compared voltage to output an amplified voltage to the horizontal output and deflection portion.

The above described comparison and amplifying portion may well utilize a bias control portion for controlling current flow from the voltage-to-current conversion portion so as to provide a bias voltage used to adjust a horizontal raster size, a comparison and amplifying circuit for comparing a reference voltage with the bias voltage and amplifying the comparison result voltage, and a Darlington amplifying circuit for amplifying the output current of the comparison and amplifying circuit through the operation of transistors in Darlington connection for outputting an amplified current.

To further achieve the above objects of the present invention there is provided a horizontal raster size controller in a monitor for outputting an induced output signal of a horizontal output and deflection portion, to an anode of a cathode ray tube, across both windings of a flyback transformer, by control of a flyback voltage controller and for sensing a high voltage regulation from an induced voltage level which is taken across a coil provided for detecting induced current of the flyback transformer so as to control the level of voltage on the primary side of the flyback transformer, which controller includes an error detection circuit and a horizontal raster compensation circuit for performing horizontal raster compensation for a display monitor.

The error detection results in the generation of a pulse signal at a voltage level corresponding to in induced voltage across the windings. The horizontal raster compensation circuit for performing horizontal raster size compensation compares a preset reference voltage with the output signal of the error detection circuit and outputs a compensation signal or a compared signal corresponding to the magnitude of resulting compared difference to an input terminal of the horizontal output and deflection portion in order to control the horizontal raster size.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more through understanding of the present invention. It will be apparent however, to those skilled in the art, that the present invention may be practiced without these specific details. In other instances, well known circuits have not been described so as not to obscure the present invention.

DETAILED DESCRIPTION OF THE PREFERRED EMBODIMENT

A video signal generated from a video signal source (not illustrated) is deflection processed in horizontal output and deflection portion 10 and is then applied to a first coil, or primary winding L1 on the primary side of flyback transformer FBT. Current flowing throw the primary winding L1 of flyback transformer FBT is induced to the respective terminals of a plurality of windings L2 and L3 on secondary side of flyback transformer FBT by the operation of a switching mode of a flyback voltage controller 12.

The induced current across windings on both sides of flyback transformer FBT is shaped by a plurality of diodes D1, D2 and D3 and is then smoothed by capacitance C1. The smoothed current is supplied to an anode of a cathode ray tube (not shown) and is also applied to focus resistor R1 and screen resistor R2 serially connected.

An automatic beam limit signal ABL controls current induced across the windings on the secondary side of flyback transformer FBT when current as above described is induced and smoothed to reach at a predetermined level of voltage. A separate coil, or winding, L4 is required for preventing an inducement of overvoltage across the primary windings of flyback transformer FBT.

The primary winding of coil L4, provided on the primary side of flyback transformer, directs and stores induced current. The induced current is shaped through diode D4 and is smoothed by capacitor C3, and is then applied to high voltage sensor 14 at a predetermined voltage level. High voltage sensor 14 detects a voltage of a predetermined level and generates a control signal for output to flyback voltage controller 12. When overvoltage beyond a predetermined level of voltage is sensed, operation of flyback voltage controller 12 is stopped, thereby performing the operation of shutting down the overall operation of inducing an electrical current across the flyback transformer FBT. Namely, high voltage sensor 14 prevents high voltage inducement operation in flyback transformer FBT. As a result, malfunction of a monitor owing to high level voltage inducement and excessive radiation of x-rays due to overvoltage applied to a cathode ray tube is prevented.

Figure 1:
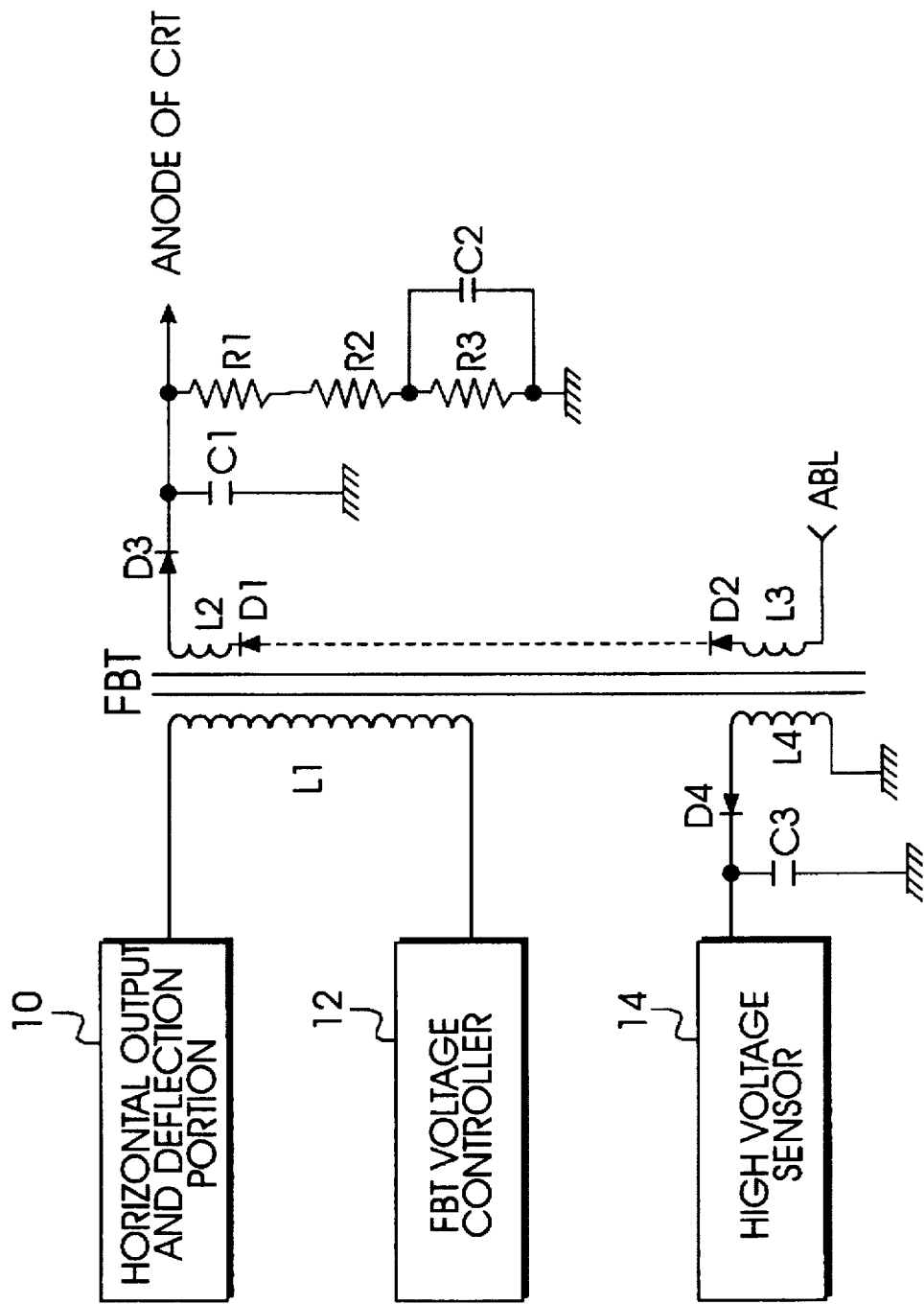
FIG. 1 is a circuit diagram illustrating one conventional design for a horizontal raster size controller for a monitor.
Figure 2:
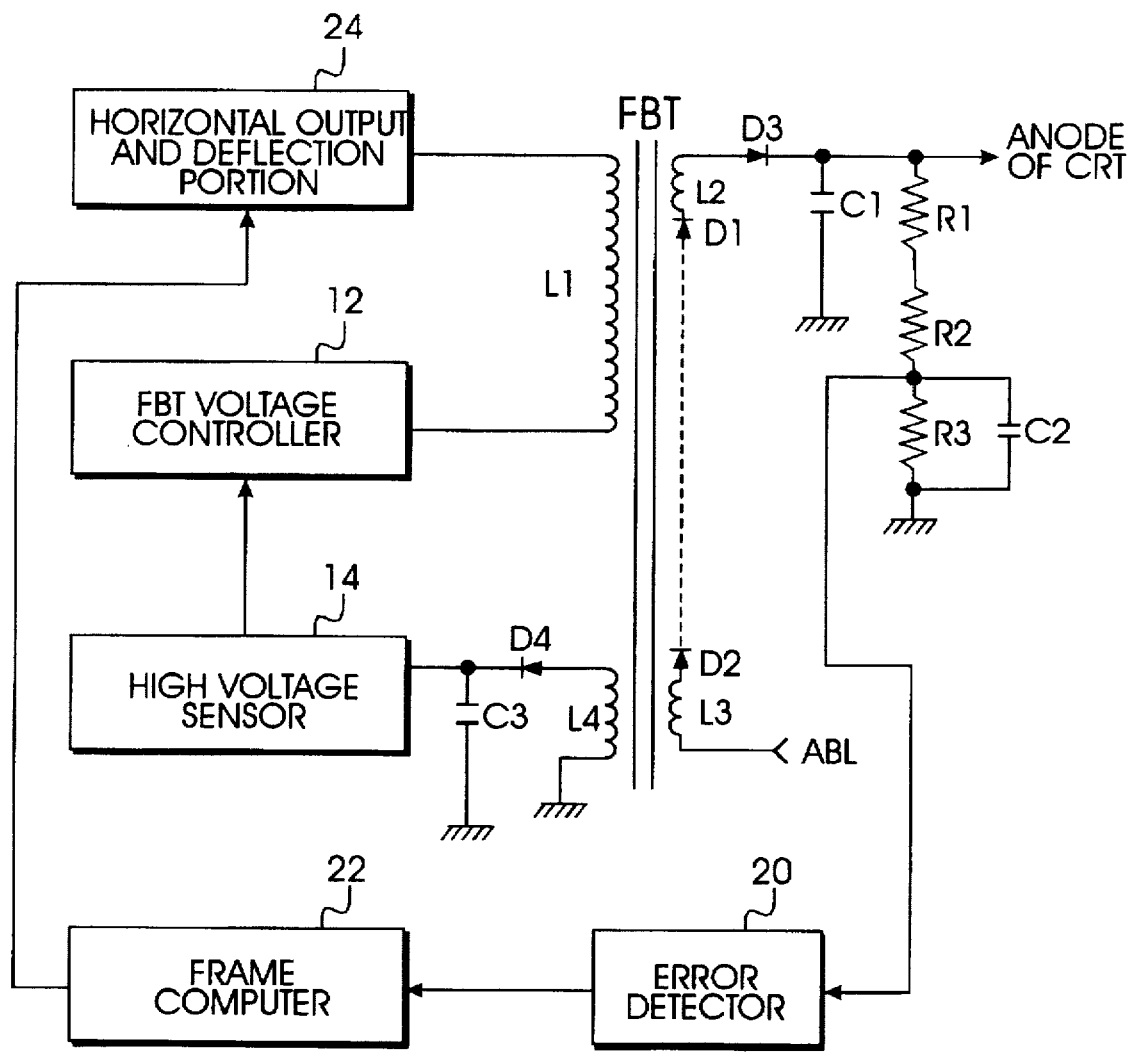
FIG. 2 is a preferred embodiment of a horizontal raster size controller constructed according to the principles of the present invention.

Referring now in detail to FIG. 2 a preferred embodiment of a horizontal raster size controller for a monitor is illustrated wherein similar notations or reference numerals designate similar or corresponding parts as discussed with regard to FIG. 1.

As illustrated in FIG. 2, in addition to or as modification in part of the construction of the embodiment as illustrated in FIG. 1, there is provided a horizontal raster size controller constructed according to the principles of the present invention, which utilizes an error detector 20 for feeding back induced voltage detected on the secondary side of flyback transformer FBT, a frame compensator 22 for generating a control signal in response to a detection signal output from error detector 20, and horizontal output and deflection portion 24 for adjusting and outputting a horizontal output signal and deflection signal in response to the control signal received from frame compensator 22.

As illustrated in FIG. 2 a focus resistor R1 a screen resistor R2 and a load resistor R3 are coupled in series between the anode of a cathode ray tube (not shown) and a reference potential or ground terminal. Error detector 20 receives, as a detection signal, a voltage signal which is taken at a node collectively coupled between screen resistor R2 and load resistor R3. Another arrangement (not shown) may be provided according to a users desire wherein error detector 20 is coupled to receive, as the detection signal, a voltage signal being applied to high voltage sensor 14 which was initially generated at the output terminal of coil L4 and then shaped and smoothed by diode D4 and capacitor C3, respectively. Accordingly, either a beam current applied to an anode of a cathode ray tube or detected high level voltage provided to a high level voltage sensor may be alternatively utilized as the above mentioned detection signal.

Figure 3:
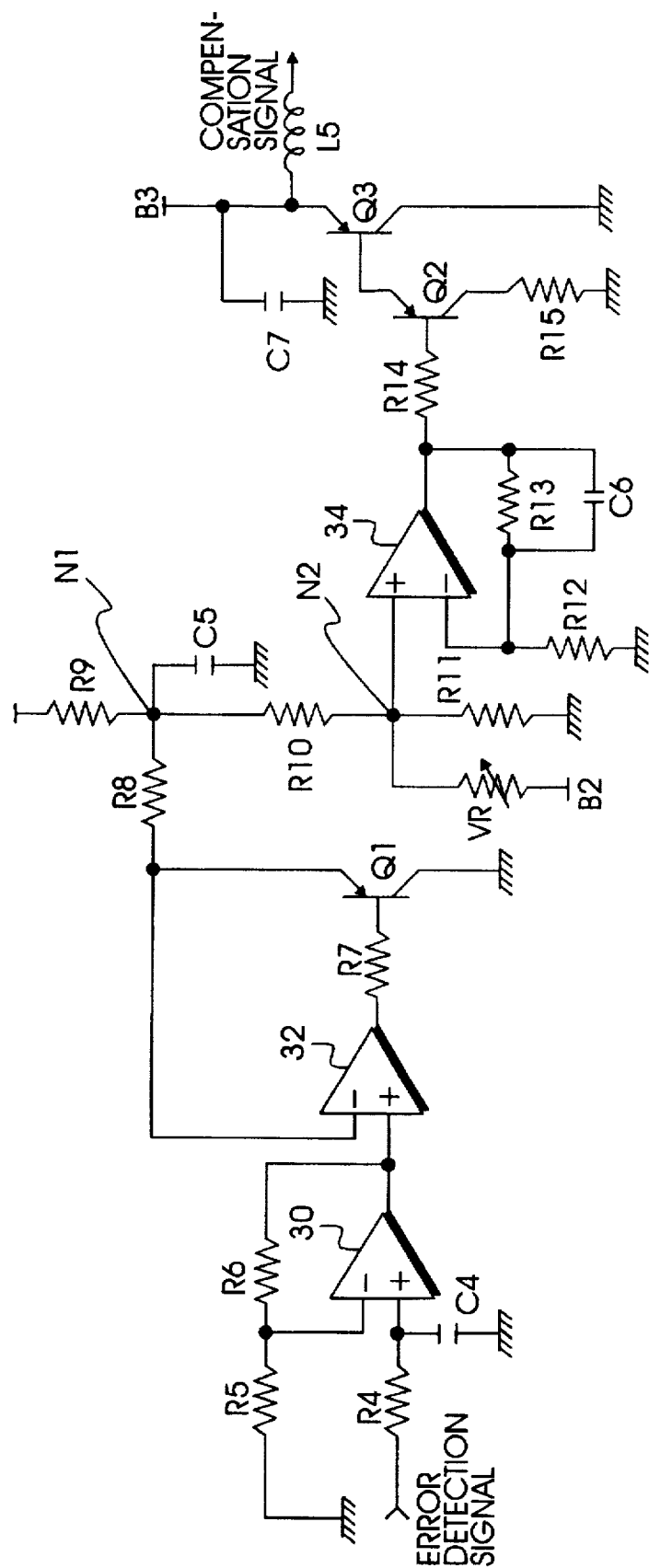
FIG. 3 is a detailed circuit diagram of the frame compensator of the embodiment constructed according to the present invention, as shown in FIG. 2.

Now referring to FIG. 3, frame compensator 22 illustrated in FIG. 2 is shown in a more detailed circuit diagram.

The error detection signal output by error detector 20 of FIG. 3 is provided to one end of a resistor R4, tile other end of which is connected to a non-inverting input terminal of an operational amplifier 30. A capacitor C4, connected between the non-inverting input terminal of the operational amplifier 30 and a ground potential, smooths the pulses of the error detection signal received from error detector 20 to a predetermined voltage level. A grounding resistor R5 coupled between a reference (ground) potential and the inverting input terminal of operational amplifier 30 provides a reference voltage to tile inverting terminal of operational amplifier 30, and an output feedback resistor R6 is connected between the output terminal and the inverting input terminal of the operational amplifier 30.

An operational amplifier 32 converts an output voltage generated from operational amplifier 30 into corresponding current, wherein operational amplifier 30 generates the output voltage as a result of a comparison between the reference voltage from resistor R5 and the smoothed error detection signal. Voltage-to-current conversion operational amplifier 32 has its output terminal connected to a base electrode of transistor Q1 via resistor R7.

Resistor R9, one end of which is connected to first voltage source B1, and capacitor C5 one end of which is connected to a ground potential (such as a local circuit ground) are commonly coupled to first node N1 in order to variably bias voltage B1 for adjusting the size of a frame following variations in the amplitude of a current output from voltage-to-current conversion amplifier 32 by a charging and discharging operation of capacitor C5. A resistor R8 is coupled between a collector terminal of transistor Q1 and first node N1 through which a current is input to the inverting input terminal of voltage-to-current conversion amplifier 32. A resistor R10 is interposed between first node N1 and a second node N2.

A variable resistor VR for varying a voltage is provided between a voltage source B2 and second node N2. Voltage source B2 may alternatively be a ground reference potential. A resistor R11 is coupled between second node N2 and a ground reference potential. However, resistor R11 alternatively could be connected to voltage source B2 instead of the ground reference potential. Therefore, variable resistor VR and resistor R11 may be coupled in parallel between a reference potential, such as voltage source B2, and node N2. Accordingly variable resistor VR, or variable resistor VR and resistor R11 if coupled in parallel, adjust a raster size control voltage.

A non-inverting input terminal of a third operational amplifier 34 is coupled to second node N2. Operational amplifier 34 is a differential amplifier. A resistor R12 is connected between an inverting input terminal of differential amplifier 34 and a reference (ground) potential. A resistor R13 for differential amplification and smoothing capacitor C6 are coupled in parallel between the inverting input terminal and the output terminal of differential amplifier 34. The output terminal of differential amplifier 34 is connected a base electrode of transistor Q2 via output resistor R14.

A Darlington circuit is formed by the connections of transistor Q2 transistor Q3, wherein an emitter electrode of transistor Q3 is commonly connected to a voltage source B3, a charging and discharging capacitor C7, and a current output inductor L5. Capacitor C7 is further connected to a reference potential. The collector of transistor Q2 is connected to a reference potential via resistor R15 and the collector of transistor Q3 is directly connected to the reference potential.

Now, a detailed operation for compensating for altered raster size by overvoltage inducement in flyback transformer FBT or for compensating for a variation of beam current will be discussed hereinafter by way of a non-limiting example.

When an output signal at the output terminal of horizontal output and deflection portion 24 is induced across windings of flyback transformer FBT in proportion to the respective turns ratio of secondary and third windings by a switching mode operation of flyback transformer voltage controller 12, an induced voltage at respective terminals of a plurality of windings on secondary side of flyback transformer is shaped and smoothed by combination of serially connected diodes D1, D2 and D3 and smoothing capacitor C1, and is then applied to an anode of a cathode ray tube and to serially connected focus resistor R1 screen resistor R2 and load resistor R3.

Once an excessive beam current flows through screen resistor R2, then the brightness of the screen becomes visibly lighter thereby widening the horizontal raster size of a frame. When error detector 20 receives such an overcurrent, it outputs pulses having a duty factor, or a duty cycle, in dependence upon the amplitude of the detected high output voltage. These pulses are then provided to frame compensator 22.

Frame compensator 22 generates a compensation signal in accordance with the width of the error pulses received from error detector 22. Frame compensator 22 provides the compensation signal to horizontal output and deflection portion 24.

Here, operational amplifier 30 amplifies and outputs a DC voltage signal in response to the error detection signal received at its non-inverting input terminal wherein the error detection signal was smoothed by a combination of resistor R4 and capacitor C4. The DC voltage signal is, in turn, applied to an non-inverting input terminal of voltage-to-current conversion amplifier 32. Voltage-to-current conversion amplifier 32, resistor R7 and first transistor Q1 are connected in cascade, for converting an input voltage to a corresponding current.

The more an output voltage of voltage-to-current conversion amplifier 32 being applied to the base electrode of transistor Q1 through resistor R7 increases, the more the amplitude of current flowing through resistor R8 attenuates. On the contrary, the more the output voltage of voltage-to-current conversion amplifier 32 being applied to the base electrode of transistor Q1 annenuates, the more the current flowing through resistor R8 increases. Increased current flow represents an increased relative electric potential difference, and vice versa. As a result, the electric potential difference at each of first node N1 and second node N2 gets relatively higher while current flow through resistor R8 decreases.

Differential amplifier 34 receives the electric potential (voltage) at second node N2 at its non-inverting input terminal in order to differentially amplify this voltage in proportion to the ratio of resistance between resistors R12 md R13. The differentially amplified output voltage generated from differential amplifier 34 is fed to a base electrode of transistor Q2 through resistor R14.

The received voltage at the base of the transistor Q2 is amplified by the Darlington connected transistors Q2 and Q3. Inductor L5 is connected to a collector electrode of transistor Q3 to provide a potential at the junction therebetween as a compensation output signal.

Accordingly, if the duty cycle of any pulse generated from error detector 20 is prolonged owing to an increment of beam current, a non-inverting input terminal of operational amplifier 30 receives an input voltage at a higher level, which voltage is then converted to a current.

Differential amplifier 34 receives a certain level of voltage, in response to the convened current, at its non-inverting input terminal and then amplifies this voltage to thereby cause substantially amplified current to flow during an ON mode of operation of transistor Q3.

A horizontal raster size of a frame eventually shrinks by virtue of an increment of beam current. Consequently, variation in the amplitude of a beam current no longer influences alternation of a horizontal raster size.

As an another embodiment of horizontal raster size controller constructed according to the principles of the present invention, in order to prevent raster size from being influenced by overvoltage or overcurrent, the horizontal raster size controller may be provided, as necessary, wherein an input terminal of error detector 20 is connected to the cathode of diode D4. Accordingly, error detector 20 receives an input voltage so as to output a detection pulse, in dependence upon the level of voltage induced through coil L4. The detection pulse would then be input to frame compensator 22. This arrangement of the controller enables frame compensator 22 to process substantially same signal processing flows as described with respect to FIG. 3 thereby generating a compensation signal for input to horizontal output and deflection portion 24.

As above described, according to two embodiments of the present invention, a compensation signal is applied to horizontal output and detection portion 24. The compensation signal is generated by frame compensator 22 which receives a pulse signal in dependence upon induced overvoltage or excessive beam current, without fluctuating the voltage level applied to flyback transformer FBT, thereby enabling a stabilized horizontal raster size to be maintained.

These embodiments of the present invention describe a horizontal raster size controller for monitor, and more particularly, to a horizontal raster size controller in a monitor for compensating tier variations in the size of the horizontal raster of frame being displayed on the monitor by comparing and amplifying a pulse signal exhibiting a train of pulses characterized by a duty cycle and varying the duty cycle in response to overcurrent or overvoltage detected in a frame compensator to supply a compensated pulse signal to a horizontal output and deflection circuit, in dependence upon detected beam current applied to a cathode ray tube or induced voltage across separate turns of a flyback transformer.

While there have been illustrated and described what is to he considered to be the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A horizontal raster size controller for a monitor, comprising:

a horizontal output and deflection circuit providing a first signal to a primary winding of a horizontal flyback transformer, said flyback transformer providing a second signal to an anode of a cathode ray tube of said monitor;

error detection means for generating an error detection signal by detecting overcurrent in said second signal provided to said anode of said cathode ray tube;

comparison means for generating a first voltage signal indicative of a difference between said error detection signal and a reference potential;

voltage-to-current conversion means for converting said voltage signal to corresponding current;

means for providing a second voltage signal, said second voltage signal being varied in response to current output by said voltage-to-current conversion means;

differential amplifying means for generating a differentially amplified signal by amplifying said second voltage level; and means for generating said compensation signal in response to said differentially amplified signal.

2. The horizontal raster size controller as set forth in claim 1, said means for generating said compensation signal comprising:

a first transistor connected to a second transistor, a base of said first transistor coupled to receive said differentially amplified signal, a collector of said first transistor being connected to a ground potential via a resistor, a base of said second transistor being connected to an emitter of said first transistor, a collector of said second transistor being directly connected to said ground potential, and an emitter of said second transistor being connected to a node;

a voltage source connected to said node;

a capacitor connected between said ground potential and said node; and an inductor having a first terminal coupled to said node and a second terminal for outputting said compensation signal to said horizontal output and deflection circuit.

3. A horizontal raster size controller for a monitor in which an output signal of a horizontal output and deflection circuit is induced across a plurality of windings on secondary side of a flyback transformer driven by a switching mode operation of a flyback transformer voltage controller on a primary side of said flyback transformer to provide a signal to an anode of a cathode ray tube, said horizontal raster size controller comprising a compensation circuit, said compensation circuit comprising:

error detection means for generating an error detection pulse signal by detecting a voltage level of said signal provided to said anode of said cathode ray tube; and compensation means coupled to receive said error detection pulse signal from said error detection means, said compensation means generates a current signal in response to said error detection pulse signal, generates a differentially amplified voltage in response to said current and generates a compensation signal in response to said differentially amplified voltage for compensating a horizontal raster size in a frame displayed by said monitor, said compensation signal being applied to said horizontal output and deflection circuit, said compensation means comprising:

comparison means the receiving said error detection pulse signal and for generating a direct current voltage signal which represents a difference between said error detection pulse signal and a reference potential;

voltage-to-current conversion means for converting said direct current voltage signal generated from said comparison means to corresponding current;

amplifying means for receiving an varied voltage level varied in response to a value of said current and for generating an amplified signal by differentially amplifying said varied voltage level; and means for generating said compensation signal in response to said amplified signal;

said comparison means comprising:

a first resistor and a capacitor coupled in series between said error detection means and said reference potential smoothing said error detection pulse signal; and an operational amplifier having a non-inverting input terminal coupled to a common connection between said resistor and said capacitor for receiving the smoothed error detection pulse signal, and an inverting input terminal connected to said reference potential via a second resistor, an output terminal of said operational amplifier being connected to said inverting input terminal via a third resistor, said operation amplifier generating said direct current voltage signal in response to a comparison between said smoothed error detection signal and said reference potential supplied through said second resistor.

4. The circuit as set forth in claim 3, said means for generating said compensation signal in response to said amplified signal comprising:

a first transistor Darlington connected to a second transistor, a base of said first transistor coupled to receive said amplified signal, a collector of said first transistor being connected to said reference potential via a resistor and a base of said second transistor being directly connected to said reference potential;

a voltage source connected to an emitter of said second transistor;

a capacitor connected between said reference potential and said emitter of said second transistor; and an inductor coupled to said emitter of said second transistor for outputting said compensation signal to said horizontal output and deflection circuit.

5. A horizontal raster size controller for a monitor in which an output signal of a horizontal output and deflection circuit is induced across a plurality of windings on secondary side of a flyback transformer driven by a switching mode operation of a flyback transformer voltage controller on a primary side of said flyback transformer to provide a signal to an anode of a cathode ray tube, said horizontal raster size controller comprising a compensation circuit, said compensation circuit comprising:

error detection means for generating an error detection pulse signal by detecting a voltage level of said signal provided to said anode of said cathode ray tube; and compensation means coupled to receive said error detection pulse signal from said error detection means, said compensation means generates a current signal in response to said error detection pulse signal, generates a differentially amplified voltage in response to said current and generates a compensation signal in response to said differentially amplified voltage for compensating a horizontal raster size in a frame displayed by said monitor, said compensation signal being applied to said horizontal output and deflection circuit, said compensation means comprising:

comparison means for receiving said error detection pulse signal and for generating a direct current voltage signal which represents a difference between said error detection pulse signal and a reference potential;

voltage-to-current conversion means for converting said direct current voltage signal generated from said comparison means to corresponding current;

amplifying means for receiving an varied voltage level varied in response to a value of said current and for generating an amplified signal by differentially amplifying said varied voltage level; and means for generating said compensation signal in response to said amplified signal, said means for generating said compensation signal in response to said amplified signal comprising:

a first transistor Darlington connected to a second transistor, a base of said first transistor coupled to receive said amplified signal, a collector of said first transistor being connected to said reference potential via a resistor and a base of said second transistor being directly connected to said reference potential;

a voltage source connected to an emitter of said second transistor;

a capacitor connected between said reference potential and said emitter of said second transistor; and an inductor coupled to said emitter of said second transistor for outputting said compensation signal to said horizontal output and deflection circuit.

6. The circuit as set forth in claim 5, said comparison means comprising:

a first resistor and a capacitor coupled in series between said error detection means and said reference potential for smoothing said error detection pulse signal;

an operational amplifier having a non-inverting input terminal coupled to a common connection between said resistor and said capacitor for receiving the smoothed error detection pulse signal, and an inverting input terminal connected to said reference potential via a second resistor, an output terminal of said operational amplifier being connected to said inverting input terminal via a third resistor, said operation amplifier generating said direct current voltage signal in response to a comparison between said smoothed error detection signal and said reference potential supplied through said second resistor.

\* \* \* \* \*

UNITED STATES PATENT AND TRADEMARK OFFICE
CERTIFICATE OF CORRECTION

Page 1 of 2

PATENT NO. : 5,627,437
DATED : May 6, 1997
INVENTOR(S) : Seog-Gi Kim

It is certified that error appears in the above-indentified patent and that said Letters Patent is hereby corrected as shown below:

IN THE ABSTRACT

Line 6, before "horizontal", insert --a--:

Column 1, Line 19, before "to", change "an" to --art--;

Column 2, Line 27, after "high", change "Output" to --output--;

Column 7, Line 4, after "and", change "vice versa" to --*vice versa*--(italic); and Line 12, before "R13", change "md" to --and--:

UNITED STATES PATENT AND TRADEMARK OFFICE
CERTIFICATE OF CORRECTION

PATENT NO. : 5,627,437
DATED : May 6, 1997
INVENTOR(S) : Seog-Gi Kim

It is certified that error appears in the above-indentified patent and that said Letters Patent is hereby corrected as shown below:

IN THE CLAIM

Claim 3,  Line 18,  "means" should read --means for receiving--

Line 34,  between "potential" and "smoothing", insert --for--:

Signed and Sealed this

Twelfth Day of August, 1997

Attest:

BRUCE LEHMAN

Attesting Officer

Commissioner of Patents and Trademarks